United States Patent [19]

Horner

[11] Patent Number: 4,579,465

[45] Date of Patent: Apr. 1, 1986

[54] SELF-CENTERING BEARING

[75] Inventor: Robert D. Horner, Bethany, Okla.

[73] Assignee: LSB Bearing Corp., Oklahoma City, Okla.

[21] Appl. No.: 715,734

[22] Filed: Mar. 25, 1985

[51] Int. Cl.⁴ ............................................. F16C 23/08
[52] U.S. Cl. ..................................... 384/612; 384/901
[58] Field of Search ............... 384/612, 901, 620, 615, 384/622, 617; 308/DIG. 4

[56] References Cited

U.S. PATENT DOCUMENTS

| | | | |
|---|---|---|---|
| 3,333,664 | 8/1967 | Chapaitis | 192/98 |
| 3,416,637 | 12/1968 | Maurice | 192/98 |
| 3,625,327 | 12/1971 | Birdsey | 192/110 B |
| 3,741,361 | 6/1973 | Brandenstein | 192/110 B |
| 3,921,775 | 11/1975 | Matyschik | 384/612 |
| 4,029,186 | 6/1977 | de Gennes | 192/98 |
| 4,144,957 | 3/1979 | de Gennes | 192/98 |
| 4,228,881 | 10/1980 | Nakamura | 192/98 |
| 4,478,325 | 10/1984 | Dagiel | 384/612 |

Primary Examiner—Lenard A. Footland
Attorney, Agent, or Firm—Dunlap, Codding & Peterson

[57] ABSTRACT

A self-centering bearing mounted for substantially free radial, floating movement with respect to a support having cooperating shoulders on the bearing and the support to limit the extent of radial movement of the bearing.

37 Claims, 8 Drawing Figures

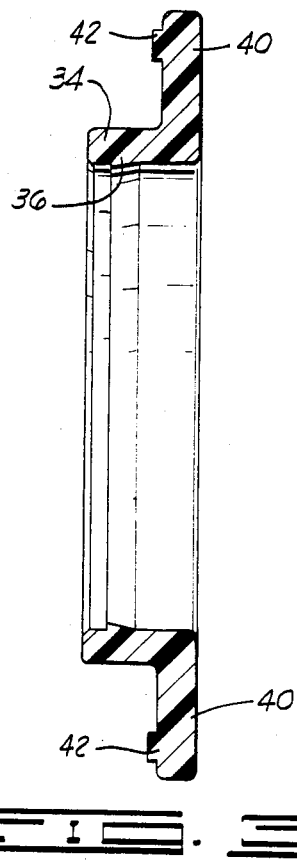
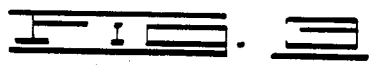
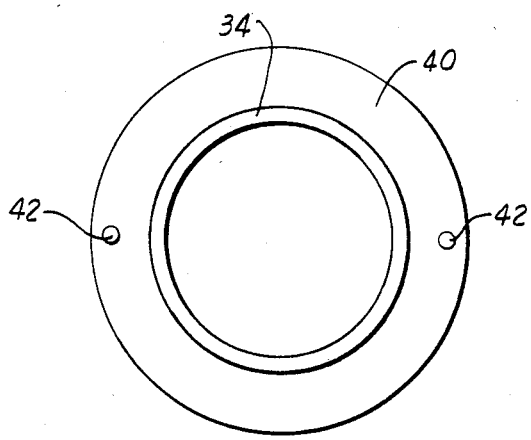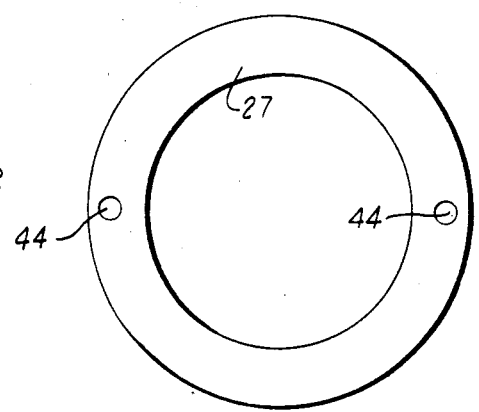
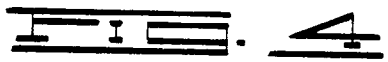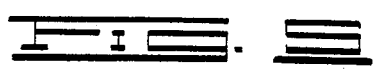

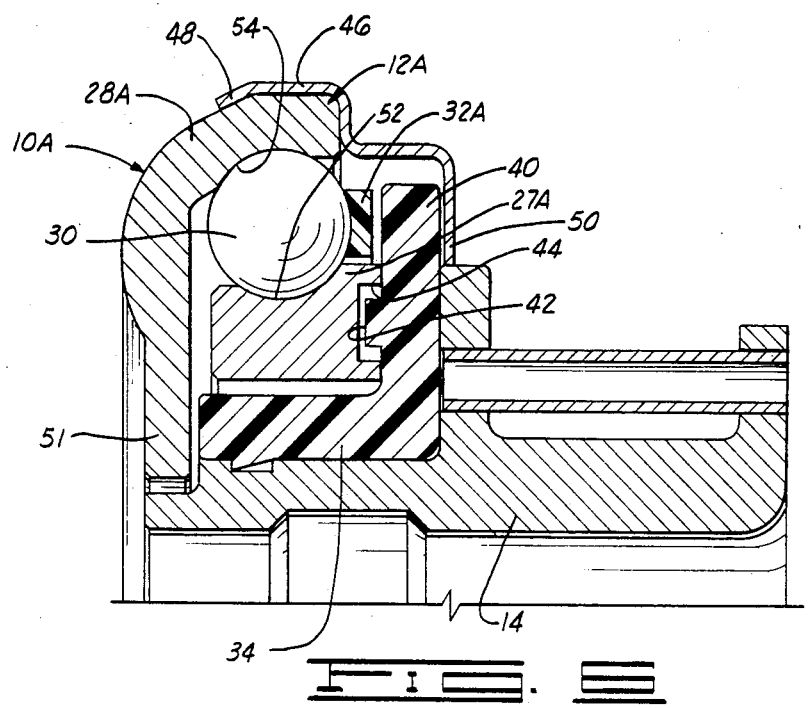
FIG. 6
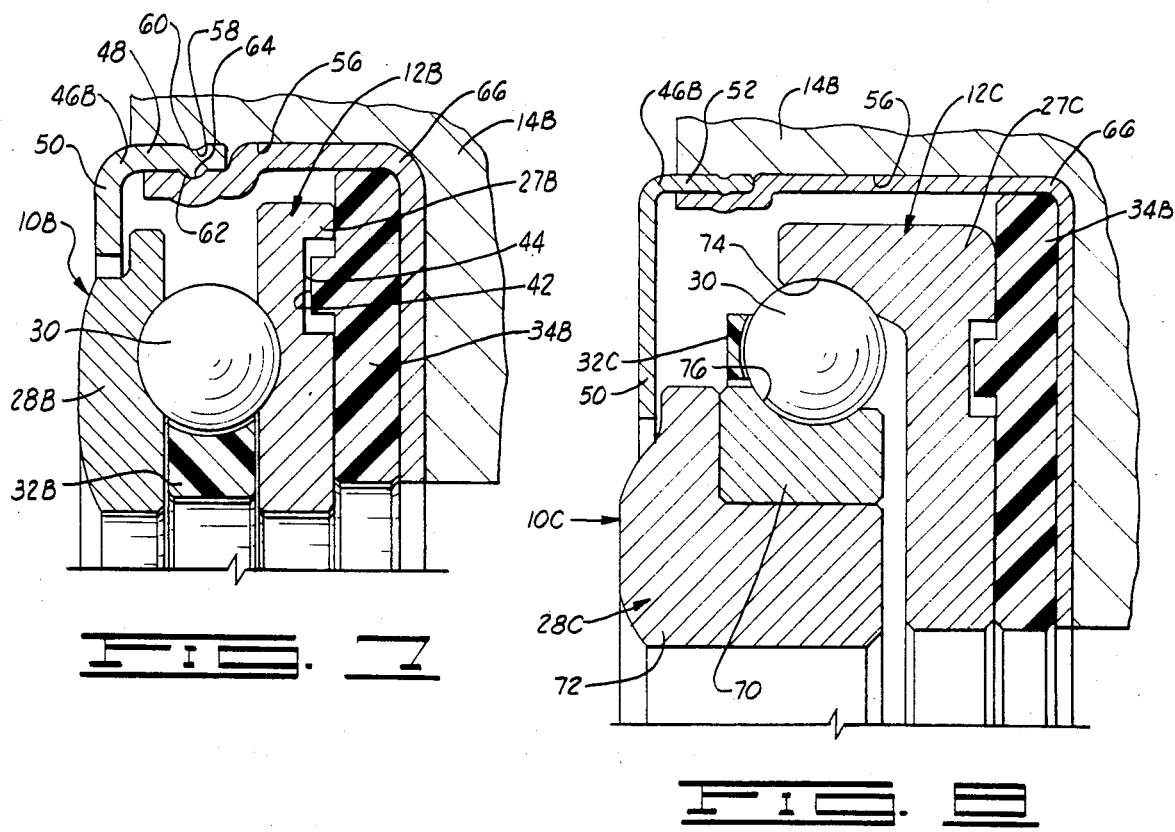
FIG. 7
FIG. 8

SELF-CENTERING BEARING

BRIEF SUMMARY OF THE INVENTION

1. Field of the Invention

This invention relates to self-centering bearings, and more particularly, but not by way of limitation, to self-centering, clutch release bearings.

2. Background of the Invention

Clutch release bearings are commonly used between the transmission and a power source employing a clutch releasing means. These bearings commonly employ a sleeve or carrier mounted for axial sliding movement on a front cover projecting from the transmision to support the bearing. One race of the bearing is rotatable and is caused to bear against a torque transmitting member, such as a diaphragm spring, fingers or pawl of the clutch device to thereby create the release action of the clutch. Self-centering type bearings are commonly employed because of the extreme difficulty in manufacturing and assembling the clutch and the support on which the sleeve is mounted for precise alignment of these members. The misalignment is a parallel deviation (eccentricity) between the rotational axis of the clutch and the centerline of the supporting sleeve of the bearing of the clutch release device.

Heretofore the bearing has been mounted on the supporting sleeve by means of a spring or an elastomeric material by means of which the radial movement of the bearing in its self-centering action is restrained. Such springs or elastomeric members are subject to failure and tend to inhibit the self-centering action of the bearing.

In accordance with the present invention, the bearing is free to float in any radial direction, whereby the bearing, when used as a clutch release bearing, will quickly and automatically become centered with the axis of rotation of the clutch. The only effective restraint of the movement of the bearing of the present invention is a limitation of the total radial movement of the bearing.

BRIEF DESCRIPTION OF THE DRAWINGS

FIG. 3 is a complete cross sectional view of the ring used in the bearing assembly for limiting the radial movement of the bearing.

FIG. 4 is an elevational view of the ring shown in FIG. 3 as viewed from the left-hand side of FIG. 3.

FIG. 5 is an elevational view of one face of one of the bearing races which cooperates with the ring shown in FIGS. 3 and 4 to limit the radial movement of the bearing.

FIG. 6 is a cross sectional view similar to FIG. 2 of a second embodiment of the bearing assembly.

FIG. 7 is a cross sectional view similar to FIG. 2 of a third embodiment of the bearing assembly.

FIG. 8 is a cross sectional view similar to FIG. 2 of a fourth embodiment of the bearing assembly.

DETAILED DESCRIPTION OF THE DRAWINGS

Figure 2:
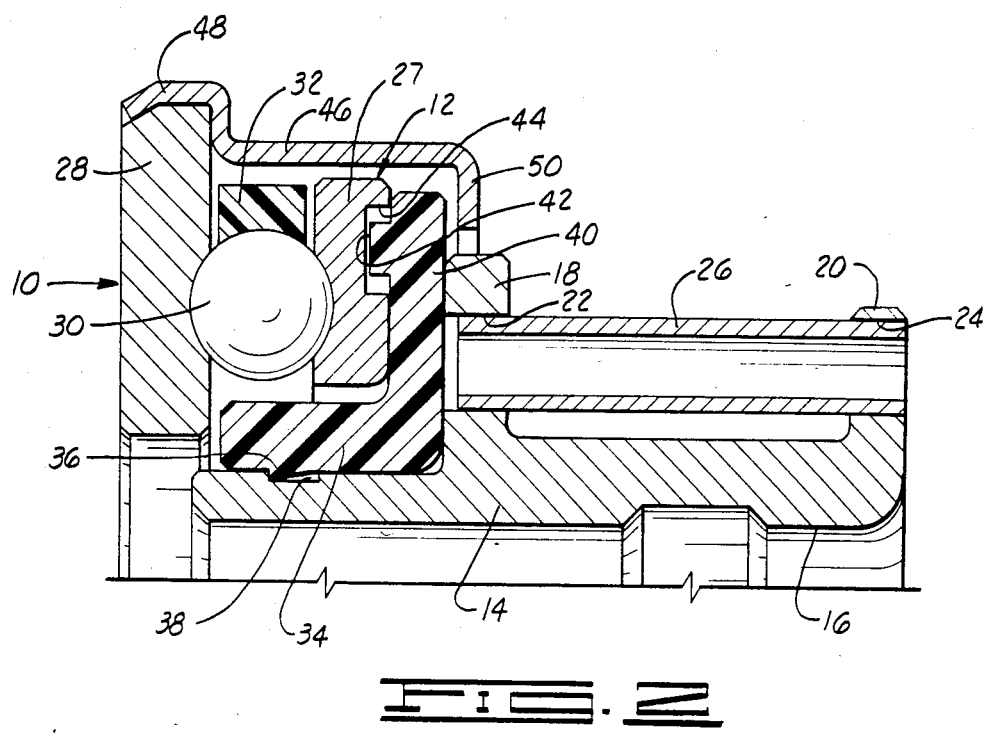
FIG. 2 is a cross sectional view taken along lines 2—2 of FIG. 1.
Figure 1:
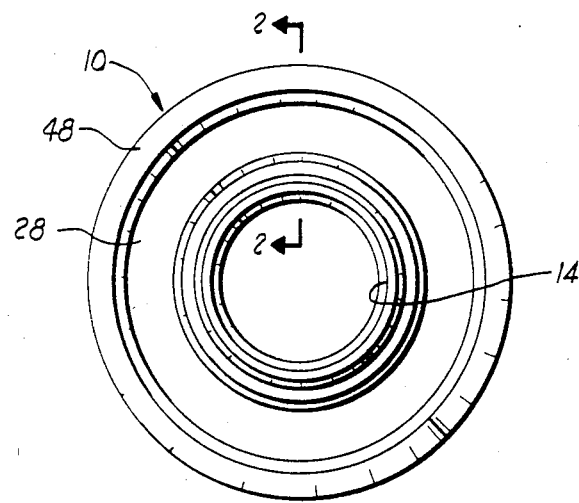
FIG. 1 is an end view of a bearing assembly constructed in accordance with this invention.

Referring to the drawings in detail, reference character 10 generally designates the bearing assembly which basically comprises a floating bearing 12 mounted around a carrier 14.

The carrier 14 is in the form of a sleeve with an inner diameter of a size to slidingly support the inner periphery 16 of the sleeve on a suitable support (not shown), such as a projection from the front of a transmission. A pair of annular flanges 18 and 20 project outwardly from the sleeve 14 and are provided with aligned apertures 22 and 24 to receive an anti-rotation pin 26 which is frictionally retained in the apertures 22 and 24. The pin 26 is provided for use in a clutch release environment to engage a fork (not shown), projecting from the clutch actuating mechanism, to prevent rotation of the sleeve 14 with respect to the clutch actuating mechanism.

The bearing 12 comprises a first bearing race 27 and a second bearing race 28 held in spaced apart relation by a plurality of bearing members, such as balls 30, by means of which one of the races can be freely rotated with respect to the other race. The races 27 and 28 are annular in configuration and a plurality of the balls 30 are normally used, with the balls 30 being held in their operating positions by a conventional ball bearing retainer 32. In the bearing assembly 10, the race 28 is the race which is free to rotate and, when used in a clutch release environment, is the member which engages the clutch fingers, diaphragm or pawl depending upon what design of clutch is employed, for releasing the clutch when the bearing assembly 10 is moved to the left as shown in FIG. 2.

The bearing 12 is limited in the extent of radial movement with respect to the carrier 14 by a ring 34 fixedly attached to the carrier 14 in such a manner as to effectively become a part of the carrier 14. A projection 36 on the inner periphery of the ring 34 fits in a mating annular slot 38 extending around the carrier 14 to assist in rigidly mounting the ring 34 on the carrier 14. When the ring 34 is made of a plastic type material, as indicated in the drawing, the ring can be easily forced around the carrier 14 until the projection 36 deforms into the slot 38 which holds the ring 34 in the desired position against movement to the left as shown in FIG. 2.

An annular flange 40 extends outwardly from one end of the ring 34 between the bearing race 27 and the carrier flange 18 and in contact with the flange 18 to prevent movement of the ring 34 to the right as illustrated in FIG. 2. A pair of diametrically opposed pins or projections 42 are provided on the face of the flange 40 which faces the corresponding face of the race 27 as shown in FIGS. 2, 3 and 4. The pins or projections 42 extend into slots 44 provided in the face of the bearing race 27 which faces the flange 40 so that the pins 42 and slots 44 form cooperating shoulders on the flange 40 and bearing race 27. The diameter of the slots 44 is slightly larger than the outer diameter of the pins 42 to limit both the radial movement of the race 27 and the rotary movement of the race 27, as will be set forth more fully hereinafter.

A closure cup 46 surrounds the bearing 12. One end portion 48 of the closure cup 46 is bent over into engagement with the outer periphery of the bearing race 28, and the opposite end portion 50 of the closure cup 46 is extended radially inward into close proximity with the adjacent face of the flange 40. The spacing between the closure cup end portion 50 and the adjacent face of the flange 40 is shown enlarged in FIG. 2 for clarity of illustration. In actual manufacture, this space is very limited, such as from 0.004 to 0.012 inches, such that the left to right movement of the bearing 12 is very limited, and whereby the bearing races will be maintained in the desired assembled relation as shown in FIG. 2. As previously indicated, when the present bearing assembly is used in a clutch release environment, the bearing race 28 will bear against the clutch fingers of the clutch pressure plate, for example, which will maintain the bearing race 27 in sliding contact with the flange 40. However, when the flange 40 is formed of a plastic type material, there will be a very minimum resistance to radial movement of the bearing race 27, such that the bearing races 27 and 28, along with the balls 30 and the closure cup 46 will be free to align themselves radially with respect to the axis of rotation of the clutch and fly wheel. Also in a clutch release environment, the relative dimensions of the pins 40 and the slots 44 are preferably such that the total extent of radial movement of the bearing 12 will be on the order of 0.050 inches. Similarly, the extent of rotary movement of the bearing race 12 will be limited to an equal amount, such that the bearing race 27 will be effectively held fixed, from a rotary motion viewpoint, with the carrier 14.

Referring now to FIG. 6, shown therein and designated by the general reference numeral 10A, is a second embodiment of a bearing assembly constructed in accordance with the present invention. The bearing assembly 10A differs from the bearing assembly 10 in the construction of the floating bearing, designated 12A in FIG. 6, but is, in other respects, substantially identical to the bearing assembly 10. That is, the bearing assembly 10A is comprised of the carrier 14 that is substantially identical to the carrier 14 in the bearing assembly 10; the ring 34 which is identical to the ring 34 of the bearing assembly 10 and the closure cup 46 that is identical in overall configuration with the closure cup 46 of the bearing assembly 10. Such elements are positioned in the bearing assembly 10A in the same manner that such elements are positioned in the bearing assembly 10 and clearances are provided as discussed above with respect to the bearing assembly 10.

In the bearing assembly 10A, the first race 27A and second race 28A are positioned in a generally concentric relation as shown in FIG. 6 so that the second race 28A surrounds the first race 27A. The second race 28A has a radially inwardly extending flange 51 which bears against the clutch fingers of the clutch pressure plate in the manner that the bearing race 28 of the bearing assembly 10 bears against the clutch fingers of the clutch pressure plate as discussed above. In order to provide axial support between the bearing races 27A and 28A, arcuate, circumferentially extending grooves 52 and 54 are formed in the races 27A and 28A respectively, to receive the balls 30 and be disposed partially in an axial relationship with the balls 30. A modified bearing retainer 32A is provided to hold the balls 30 in their operating positions.

The ring 34 of the bearing assembly 10A is, as noted, constructed in an identical manner to the ring 34 of the bearing assembly 10 so that the ring 34 also includes two, diametrically opposed projections 42 in the face thereof which faces the first bearing race 27A. Similarly, two diametrically opposed slots 44 are formed in the face of the first bearing race 27A that faces the flange 40 of the ring 34 to receive the pins 42 in the same manner and for the same purpose that the slots 44 in the first bearing race 27 of the bearing assembly 10 receive the pins 42 on the ring 34 of the bearing assembly 10. (Only one slot 44 has been illustrated for the first bearing race 27A. However, it is to be understood that the first bearing race 27A is to include two diametrically opposed slots positioned in the manner shown for the bearing race 27 shown in FIG. 5 to receive the two diametrically opposed pins on the ring 34 as illustrated above in the discussion of the bearing assembly 10.)

As in the bearing assembly 10, the closure cup 46 of the bearing assembly 10A has one end portion 48 bent over into engagement with the outer periphery of the second bearing race 28A and the opposite end portion 50 extended radially inward into close proximity with the adjacent face of the flange 40 of the ring 34. The positioning of the end portion 50 with respect to the flange 40 serves the same purpose that has been discussed above and is limited in the manner also discussed above in the description of the bearing assembly 10.

FIG. 7 illustrates a third embodiment of a bearing assembly, designated 10B, constructed in accordance with the present invention and, in particular, FIG. 7 illustrates a bearing assembly in which the carrier, designated 14B in FIG. 7, is positioned about the floating bearing, designated 12B in FIG. 7, rather than within the floating bearing as shown for the bearing assemblies 10 and 10A. (Only a portion of the carrier 14B has been illustrated in FIG. 7. The carrier 14B is of the type that may be used with a hydraulically actuated clutch release assembly.) To this end, the carrier 14B is provided with a cavity 56 having a mouth (not numerically designated in the drawings) that is illustrated as opening to the left in FIG. 7. The bearing 12B, comprised of axially positioned first and second bearing races 27B and 28B, is then disposed within the cavity 56 and maintained therein via a projection 58 that extends circumferentially about the cavity 56 to engage a circumferentially extending depression 60 formed in an end portion 48 of a closure cup 46B, that performs the same functions as the closure cup 46 of the bearing assembly 10. In particular, a second end portion 50 of the closure cup 46B is extended radially inward into close proximity with an adjacent face of the second bearing race 28B, positioned at the mouth of the cavity 56, to permit limited axial movement of the bearing 12B in the same manner that the spacing of the end portion 50 of the closure cup 46 and the ring 34 of the bearing assembly 10 provide limited axial movement of the bearing 12. The space between the end portion 50 of the closure cup 46B and the second bearing race 28B, such space being the same as the corresponding space in the bearing assembly 10, is fixed by a retainer cup which receives a ring 34B that supports the first bearing race 27B and is fixed within the cavity 56 via a circumferentially extending depression 64 that receives a circumferential projection 62 on the inner periphery of the closure cup 46B formed by the formation of the depression 60 in the closure cup 46B. The ring 34B carries pins 42 that cooperate with slots 44 in the first bearing race 27B, in the same manner and for the same purpose as described above for the slots 42 and 44 in the first bearing races 27 and 27A. The ring 34B is substantially identical to the flange portion 40 of the ring 34 to include two diametrically opposed pins 42, only one of which is illustrated in FIG. 7. (The pins 42 are positioned on the ring 34 in the same manner that pins 42 are positioned on the flange 40 in FIG. 4.) The first bearing race 27B similarly includes two diametrically opposed slots 44, only one of which has been shown in FIG. 7, in the same manner, and identically positioned, as the first bearing race 27. That is, the slots 44 of the bearing race 27B are positioned as shown for the slots 44 of the bearing race 27 in FIG. 5. Balls 30, held in operating positions by a ball bearing retainer 32B provide free rotation between the races 27B and 28B in the same manner that free rotation between the races of the previously described embodiment of the invention is achieved.

FIG. 8 illustrates a fourth embodiment, designated 10C of a bearing assembly constructed in accordance with the present invention, the bearing assembly 10C comprising a floating bearing 12C comprised, in turn, of concentrically disposed first and second races, 27C and 28C respectively, mounted in a cavity 56 of a carrier 14B that is identical to the carrier 14B of the bearing assembly 10B and, accordingly, identically numbered. As in the case of the bearing assembly 10B, the bearing assembly 10C is retained within the cavity 56 via a closure cup 46B having substantially the same form as the closure cup 46B of the bearing assembly 10B and fixed to the carrier 14B in the same manner as in the bearing assembly 10B. The ring 34B, identical to the ring 34B of the bearing assembly 10B, is supported by a retainer cup 66 in the same manner as in the bearing assembly 10B and the cups 46B and 66 of the bearing assembly 10C are fixed together in the same manner as in the bearing assembly 10B to provide limited axial movement of the bearing 12C in the manner discussed above. In particular, the retainer cup 66 positions the ring 34B of the bearing assembly 10C in the cavity 56 so that the limited axial movement is provided by a space between the end portion 50 of the closure cup 46B and an adjacent face of the second bearing race 28C, the end portion 52 of the closure cup being fixed on the carrier 14B in the bearing assembly 10C as discussed above.

The ring 34B is provided with a pair of diametrically opposed pins 42 (only one of the pins 42 is shown in FIG. 8) and these pins extend into two diametrically opposed slots 44 (only one of the slots 44 is shown in FIG. 8) of the first bearing race 27C in the same manner and for the same purpose that diametrically opposed pins on the ring 34B extend into diametrically opposed slots 44 in the first bearing race 27 of the bearing assembly 10. (The positioning of the pins 42 on the ring 34B of the bearing assembly 10C is the same as the positioning of the pins 42 on the flange 40 in FIG. 4 and the positioning of the slots 44 of the first bearing race 27C is the same as the positioning of the slots 44 of the first bearing race 27 shown in FIG. 5.) The first bearing race 27C is comprised of a radially inwardly extending flange 68, in which the slots 44 are formed, to provide both the concentric disposition of the races 27C and 28C and the provision of limited radial movement of the bearing 12C via the pins 42 and slots 44 that is the same for all bearings 12-12C of the present invention.

As illustrated in FIG. 8, the first bearing race 27C extends generally circumferentially about the second bearing race 28C, which is conveniently constructed in two concentric portions 70 and 72, with balls 30 disposed between the bearing races 27C and 28C in the same manner that balls 30 are disposed between the bearing races 27A and 28A of the bearing assembly 10A shown in FIG. 6. Arcuate, circumferentially extending grooves 74 and 76 are formed on the radially innermost and outermost peripheries of the first and second bearing races 27C and 28C respectively, with portions of the balls 30 grooves 74 and 76 being disposed axially of the balls 30 to provide the bearing assembly 10C with axial thrust characteristics. A conventional ball retainer 32C is provided to hold the balls 30 in their operating positions in the same manner that the ball retainers are provided in the previously discussed bearing assemblies. As in the case of the bearing assembly 10B, the second bearing race 28C of the bearing assembly 10C is positioned at the mouth of the cavity 56, with the ring 34B and first bearing race 27C positioned inwardly of the second bearing race 28C, so that the closure cup 46B of the bearing assembly 10C retains the bearing 12C in the cavity 56 in the same manner as in the bearing assembly 10B.

Changes may be made in the combination and arrangement of parts or elements as heretofore set forth in the specification and shown in the drawings without departing from the spirit and scope of the invention as defined in the following claims.

What is claimed is:

1. A self-centering bearing assembly, comprising:
   bearing support means;
   a floating bearing supported by the bearing support means, said bearing including a pair of races and means restraining relative axial movement of the races with respect to one another; and
   cooperating shoulders on the bearing support means and one of the bearing races limiting the radial movement of the bearing and limiting the rotary movement of said one bearing race with respect to the bearing support means, said shoulders being the sole means limiting the radial movement of the bearing.

2. A bearing assembly as defined in claim 1 wherein the bearing support means includes a sleeve extending at least partially through the bearing.

3. A bearing assembly as defined in claim 1 wherein the bearing support means includes an annular flange positioned adjacent said one bearing race, said shoulders on the bearing support means being on said flange.

4. A bearing assembly as defined in claim 3 wherein said races are annular in configuration and are arrayed in axially spaced relation with respect to one another.

5. A bearing assembly as defined in claim 4 wherein said shoulders are provided by means on one of the adjacent surfaces of said one bearing race and said flange for engaging the other of the adjacent surfaces of said one bearing race and said flange.

6. A bearing assembly as defined in claim 5 wherein said shoulders are provided by cooperating pins and slots on and in the adjacent surfaces of said one bearing race and said flange.

7. A bearing assembly as defined in claim 6 wherein there are two of said pins and two of said slots.

8. A bearing assembly as defined in claim 7 wherein said pins are diametrically opposed.

9. A bearing assembly as defined in claim 7 wherein said pins project axially from said flange.

10. A bearing assembly as defined in claim 4 wherein said means restraining axial movement of the bearing races comprises a closure cup encircling the bearing races having one end thereof secured to the race remote from said flange and having the opposite end thereof overlapping said flange.

11. A bearing assembly as in claim 3 wherein said races are annular in configuration and are arrayed in a substantially concentric relation with respect to one another.

12. A bearing assembly as defined in claim 11 wherein said shoulders are provided by means on one of the adjacent surface of said one bearing race and said flange for engaging the other of the adjacent surfaces of said one bearing race and said flange.

13. A bearing assembly as defined in claim 12 wherein said shoulders are provided by cooperating pins and slots on and in the adjacent surfaces of said one bearing race and said flange.

14. A bearing assembly as defined in claim 13 wherein there are two of said pins and two of said slots.

15. A bearing assembly as defined in claim 14 wherein said pins are diametrically opposed.

16. A bearing assembly as defined in claim 14 wherein said pins project axially from said flange.

17. A bearing assembly as defined in claim 11 wherein said means restraining axial movement of the bearing races comprises a closure cup encircling the bearing races having one end thereof secured to the race remote from said flange and having the opposite end thereof overlapping said flange.

18. A bearing assembly as defined in claim 1 wherein a cavity is formed in the bearing support means to receive the bearing.

19. A bearing assembly as defined in claim 18 wherein the bearing support means includes a ring positioned adjacent said one bearing race, said shoulders on the bearing support means being on said ring.

20. A bearing assembly as defined in claim 19 wherein said races are annular in configuration and are arrayed in axially spaced relation with respect to one another.

21. A bearing assembly as defined in claim 20 wherein said shoulders are provided by means on one of the adjacent surfaces of said bearing race and said ring for engaging the other of the adjacent surfaces of said bearing race and said flange.

22. A bearing assembly as defined in claim 21 wherein said shoulders are provided by cooperating pins and slots on and in the adjacent surfaces of said one bearing race and said flange.

23. A bearing assembly as defined in claim 22 wherein there are two of said pins and two of said slots.

24. A bearing assembly as defined in claim 23 wherein said pins are diametrically opposed.

25. A bearing assembly as defined in claim 23 wherein said pins project axially from said ring.

26. A bearing assembly as defined in claim 20 wherein said means restraining axial movement of the bearing races comprises a closure cup encircling the bearing races having one end thereof secured to the bearing support means and having the opposite end thereof extending radially inwardly at the mouth of said cavity to overlap the bearing.

27. A bearing assembly as in claim 19 wherein said races are annular in configuration and are arrayed in a substantially concentric relation with respect to one another.

28. A bearing assembly as defined in claim 27 wherein said shoulders are provided by means on one of the adjacent surface of said one bearing race and said ring for engaging the other of the adjacent surfaces of said one bearing race and said flange.

29. A bearing race as defined in claim 28 wherein said shoulders are provided by cooperating pins and slots on and in the adjacent surfaces of said one bearing race and said ring.

30. A bearing assembly as defined in claim 29 wherein there are two of said pins and two of said slots.

31. A bearing assembly as defined in claim 30 wherein said pins are diametrically opposed.

32. A bearing as defined in claim 30 wherein said pins project axially from said ring.

33. A bearing assembly as defined in claim 27 wherein said means restraining axial movement of the bearing races comprises a closure cup and circling the bearing races having one end thereof secured to the bearing support means and having the opposite end thereof extending radially inwardly at the mouth of said cavity to overlap the bearing.

34. A self-centering bearing assembly, comprising:
a supporting sleeve;
a ring fixedly secured around the sleeve having an annular flange portion;
a first annular bearing race around the sleeve having an inner diameter greater than the outer diameter of the sleeve in substantially free sliding engagement with one face of said flange for substantially free radial movement and having a pair of diametrically opposed slots in the face thereof facing said flange;
a second annular bearing race surrounding said sleeve having an inner diameter larger than the outer diameter of said sleeve and positioned in axial alignment with the first bearing race;
a plurality of ball bearings between said races;
a closure cup surrounding said races having one end secured to the second bearing race and its opposite end turned radially inward in close proximity to the face of said flange remote from the first bearing race; and
a pair of pins projecting from the face of said flange adjacent the first bearing race extending into said slots to limit the radial movement and rotary movement of the first bearing race.

35. A self-centering bearing assembly, comprising:
a supporting sleeve;
a ring fixedly secured around the sleeve having an annular flange portion;
first annular bearing race around the sleeve having an inner diameter greater than the outer diameter of the sleeve in substantially free sliding engagement with one face of said flange for substantially free radial movement and having a pair of diametrically opposed slots in the face thereof facing said flange;
a second annular bearing race surrounding said sleeve having an inner diameter larger than the outer diameter of said first annular bearing race and positioned in concentric alignment with the first bearing race;
a plurality of ball bearings between said races;
a closure cup surrounding said races having one end secured to the second bearing race and its opposite end turned radially inward in close proximity to the face of said flange remote from the first bearing race; and
a pair of pins projecting from the face of said flange adjacent the first bearing race extending into said slots to limit the radial movement and rotary movement of the first bearing race.

36. A self-centering bearing assembly, comprising:
supporting means having a cavity formed therein;
a ring fixedly secured within said cavity;
a first annular bearing race within said cavity having an outer diameter smaller than the inner diameter of said cavity in substantially free sliding engagement with one face of said ring for substantially radial movement and having a pair of diametrically opposed slots in the face thereof facing said ring;

a second annular bearing race having an outer diameter smaller than the inner diameter of said cavity and positioned in axial alignment with the first bearing race, the second annular bearing race positioned at the mouth of said cavity to enclose the first annular bearing race and said ring within said cavity;

a plurality of ball bearings between said races;

a closure cup surrounding said races having one end secured to said supporting means and its opposite end turned radially inward in close proximity to the face of said second bearing race facing outwardly of said cavity; and a pair of pins projecting from the face of said ring adjacent the first bearing race extending into said slots to limit the radial movement and rotary movement of the first bearing race.

37. A self-centering bearing assembly, comprising:

supporting means having a cavity formed therein;

a ring fixedly secured within said cavity;

a first annular bearing race within said cavity having an outer diameter smaller than the inner diameter of said cavity in substantially free sliding engagement with one face of said ring for substantially radial movement and having a pair of diametrically opposed slots in the face thereof facing said ring;

a second annular bearing race having an outer diameter smaller than the inner diameter of the first annular bearing race positioned in concentric alignment with said first bearing race, the second annular bearing race positioned at the mouth of said cavity;

a plurality of ball bearings between said races;

a closure cup surrounding said races and having one end secured to said bearing support means and its opposite end turned radially inward in close proximity to the outermost face of said second annular bearing race with respect to said cavity; and a pair of pins projecting from the face of said flange adjacent the first bearing race extending into said slots to limit the radial movement and rotary movement of the first bearing race.

* * * * *